May 10, 1927.  B. G. HEYWOOD  1,627,703
HAY SWEEP LOAD REMOVER
Filed Dec. 13, 1924   2 Sheets-Sheet 1

INVENTOR.
B. G. Heywood

ATTORNEY.

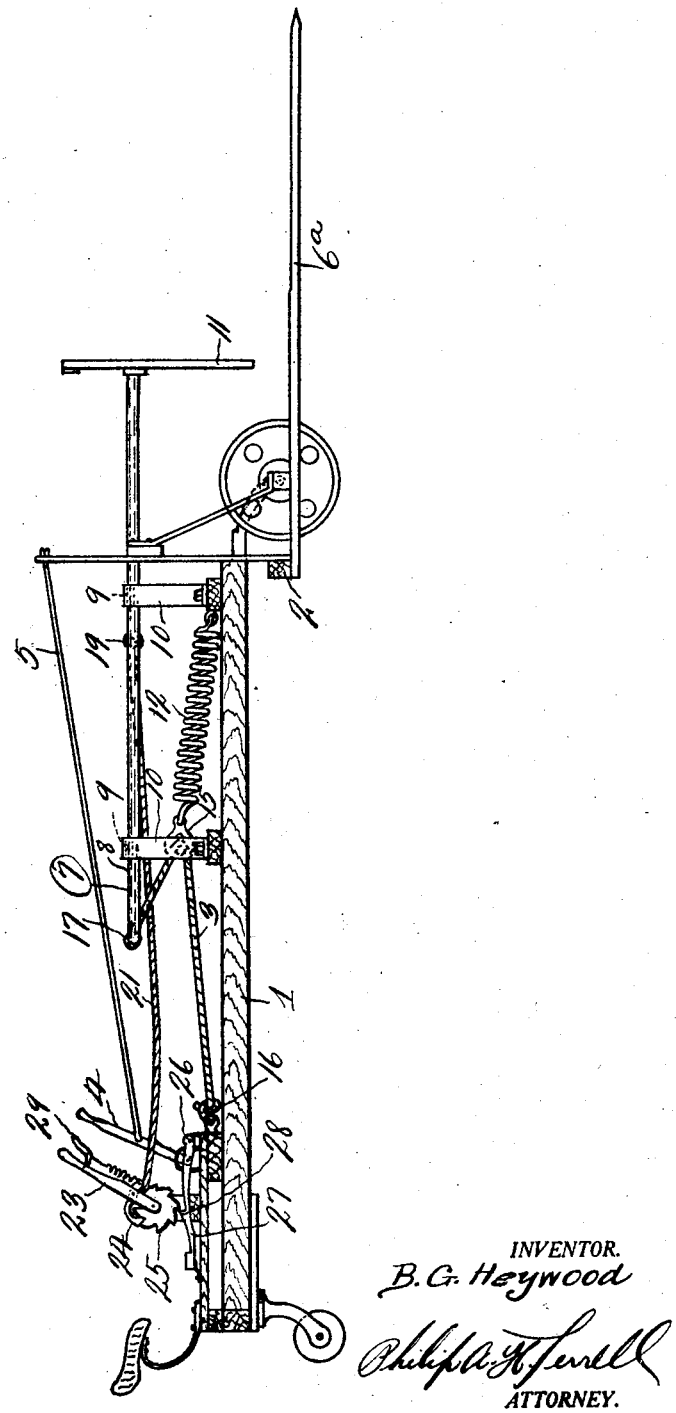

Patented May 10, 1927.

1,627,703

UNITED STATES PATENT OFFICE.

BERNARD G. HEYWOOD, OF SCRIBNER, NEBRASKA.

HAY-SWEEP LOAD REMOVER.

Application filed December 13, 1924. Serial No. 755,717.

The invention relates to hay sweep load removers, and has for its object to provide means whereby the teeth of the sweep may be easily and quickly withdrawn from beneath the load, when the load is delivered at a predetermined place of deposit.

A further object is to provide a hay load remover for hay sweeps with a slidably horizontally disposed U-shaped frame slidably mounted in bearings of brackets carried by the main frame and provided with a transverse load engaging member above the teeth of the hay sweep. Also to provide a coiled spring anchored at its forward end and provided with a pulley at its rear end and through which pulley a cable extends, which cable is anchored adjacent the rear end of the main frame and extends forwardly through the pulley and rearwardly and is anchored to the transverse portion of the slidable U-shaped member, said spring forming means for forcing the U-shaped member forwardly.

A further object is to provide a rotatable drum adjacent the rear end of the main frame and having a cable connection with the slidable frame and forming means whereby the U-shaped frame may be drawn rearwardly against the action of the spring. Also to provide lever and detent means for rotating the drum and ratchet means for holding the drum and controllable by the foot of the operator whereby said drum may be released when desired.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:

Figure 2 is a side elevation of the sweep rake.

Figure 1:
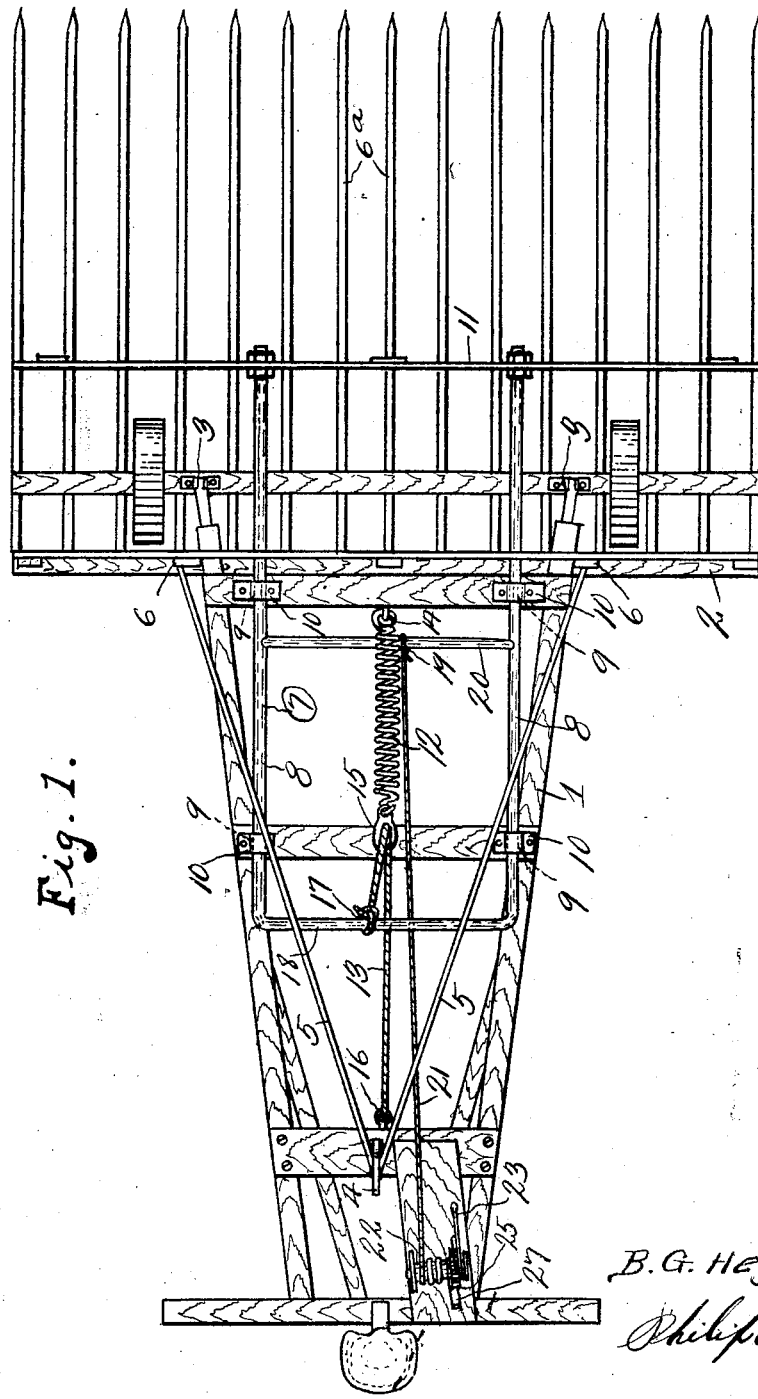
Figure 1 is a top plan view of the sweep rake, showing the unloading device in forward position.

Referring to the drawing, the numeral 1 designates the main frame of the sweep rake and 2 the tooth carrying frame, which tooth carrying frame is pivotally connected at 3 to the forward end of the frame 1 and is tilted in a vertical longitudinal plane by means of the hand lever 4 carried by the main frame adjacent its rear end and the connecting rod 5, connecting the lever and the uprights 6 of the tooth carrying frame. It has been found that during an unloading operation, it is extremely hard to deliver the load from the teeth 6ª of the rack, incident to a great deal of the load being disposed adjacent the rear end of the frame 2, even after the rake teeth have been moved downwardly into engagement with the ground and the machine backed. To obviate this difficulty the main frame 1 is provided with a horizontally disposed slidable U-shaped frame 7, the arms 8 of which are slidably mounted in bearings 9 of upwardly extending brackets 10 carried by the main frame. The arms 8 extend forwardly over the tooth frame 2, and is provided with a transversely disposed member 11 extending transversely of the teeth 6ª, and normally disposed adjacent the rear end of the frame 2, and which transversely disposed member 11, during an unloading operation, is forced forwardly in assisting in discharging the load from the teeth 2 by means of the coiled spring 12 and the cable 13. Coiled spring 12 is anchored at 14 adjacent the forward end of the main frame 1 and extends rearwardly, and is provided with a pulley 15. The cable 13 is anchored at 16 adjacent the rear end of the frame 1 and extends forwardly, thence upwardly through the pulley 15, and thence rearwardly and is anchored at 17 to the transversely disposed portion 18 of the slidable frame 7. Coiled spring 12 is a contractible one, therefore it will be seen that it will normally force the frame 7 forwardly for assisting in removing the load from the teeth 6ª during an unloading operation.

Connected at 19 to the transversely disposed bar 20 of the frame 7 is a rearwardly extending cable 21, which cable extends rearwardly over the drum 22, and which drum is rotated by means of the lever 23, which has a pawl connection 24 with a ratchet 25 carried by the drum. Pivotally connected at 26 below the ratchet 25 is a spring actuated foot lever 27 having a tooth 28, which cooperates with a ratchet 25 for preventing retrograde movement of the ratchet and drum 22, therefore it will be seen by oscillating the lever 23, the slidable frame 7 may be moved rearwardly to inoperative position when desired. It will also be seen when it is desired to release the U-shaped frame 7 during an unloading operation, it will only be necessary for the operator to lift the pawl 24 through the hand grip member 29, and then press downwardly on the foot lever 27, thereby allowing the frame 7 and the transverse member 11, to be forced forwardly under the influence of the coiled spring 12, for assisting in the unloading operation.

From the above it will be seen that a sweep rake unloading device is provided which is simple in construction, may be easily and quickly applied to a conventional form of sweep rake without modifying the construction thereof, and one which may be cheaply manufactured and sold.

The invention having been set forth what is claimed as new and useful is:—

A sweep rake comprising a main frame, a tooth frame pivotally connected to the main frame at its forward end, means for assisting in discharging the load from the tooth frame, said means comprising a horizontally disposed U-shaped frame slidably mounted in bearings of the main frame, a transversely disposed hay engaging member carried by the forward end of the U-shaped frame above the toothed frame, a coiled spring anchored to the forward end of the main frame and extending rearwardly, a cable anchored adjacent the rear end of the main frame and extending forwardly under the U-shaped frame, a pulley carried by the rear end of said spring, said cable extending upwardly through said pulley and rearwardly and anchored to the rear end of the U-shaped frame and a rotatable drum adjacent the rear end of the main frame, a cable connected to the U-shaped frame and the drum and forming means whereby said frame may be forced rearwardly against the action of the coiled spring.

In testimony whereof I affix my signature.

BERNARD G. HEYWOOD.